United States Patent
Lu et al.

(10) Patent No.: US 8,346,039 B2
(45) Date of Patent: Jan. 1, 2013

(54) METHODS FOR THREE-DIMENSIONAL NANOFOCUSING OF LIGHT AND SYSTEMS THEREOF

(75) Inventors: Zhaolin Lu, Rochester, NY (US); Ruoxi Yang, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 154 days.

(21) Appl. No.: 12/613,206

(22) Filed: Nov. 5, 2009

(65) Prior Publication Data
US 2010/0111475 A1     May 6, 2010

Related U.S. Application Data (60) Provisional application No. 61/111,597, filed on Nov. 5, 2008.

(51) Int. Cl.
  G02B 6/10 (2006.01)
  G02B 6/26 (2006.01)
  G02B 6/42 (2006.01)

(52) U.S. Cl. .......... 385/50; 385/129; 385/130; 385/131; 385/132

(58) Field of Classification Search ............. 385/50, 385/129
  See application file for complete search history.

(56) References Cited

U.S. PATENT DOCUMENTS

| | | | |
|---|---|---|---|
| 6,343,164 B1 * | 1/2002 | Robertsson et al. | 385/14 |
| 2002/0071635 A1 * | 6/2002 | Wyeth et al. | 385/33 |

OTHER PUBLICATIONS

Veronis et al., "Theoretical investigation of compact couplers between dielectric slab waveguides and two-dimensional metal-dielectric-metal plasmonic waveguides," Feb. 5, 2007, Optics Express, vol. 15, No. 3, pp. 1211-1221.*
Barnes, W., et al., "Surface plasmon subwavelength optics," Nature Publishing Group, Aug. 14, 2003, vol. 424, pp. 824-830.
Bozhevolnyi, S., et al., "Channel Plasmon-Polariton Guiding by Subwavelength Metal Grooves," Physical Review Letters, Jul. 22, 2005, The American Physical Society, PRL 95, pp. 1-4.
Bozhevolnyi, S., et al., "Channel plasmon subwavelength waveguide components including interferometers and ring resonators," Nature Publishing Group, Mar. 2006, vol. 440/23, pp. 508-511.
Ebbesen, T., et al., "Extraordinary optical transmission through sub-wavelength hole arrays," Nature Macmillan Publishers Ltd., Feb. 12, 1998, vol. 391, pp. 667-669.
Fang, N., et al., "Sub-Diffraction-Limited Optical Imaging with a Silver Superlens," Science, Apr. 22, 2005, vol. 308, pp. 534-537, (www.sciencemag.org).
Gay, G., et al., "The optical response of nanostructured surfaces and the composite diffracted evanescent wave model," Nature Publishing Group, Apr. 2006, vol. 2, pp. 262-267, (http://www.nature.com/nphys/journal/v2/n4/full/nphys264.html).

(Continued)

*Primary Examiner* — Jerry Blevins
(74) *Attorney, Agent, or Firm* — LeClairRyan, a Professional Corporation

(57) ABSTRACT

A nanofocusing system includes a dielectric waveguide having two opposing ends; and a metal-dielectric-metal layered waveguide having two opposing ends optically aligned at one end with one end of the dielectric waveguide, wherein the metal-dielectric-metal waveguide tapers in at least one dimension from the aligned end of the metal-dielectric-metal waveguide towards the opposing end, wherein light travelling through the dielectric waveguide is funneled into the dielectric layer of the metal-dielectric-metal waveguide, squeezed by the metal-dielectric-metal waveguide taper, and exits the metal-dielectric-metal waveguide as nanofocused light.

20 Claims, 12 Drawing Sheets

OTHER PUBLICATIONS

Johnson, P. B., et al., "Optical Constants of the Noble Metals," Physical Review B., Dec. 15, 1972, vol. 6, No. 12, pp. 4370-4379.

Krenn, J., et al., "Squeezing the Optical Near-Field Zone by Plasmon Coupling of Metallic Nanoparticles," Physical Review Letters, Mar. 22, 1999, The American Physical Society, vol. 82, No. 12, pp. 2590-2593.

Lezec, H., et al., "Beaming Light from a Subwavelength Aperture," Science, Aug. 2, 2002, vol. 297, pp. 820-822, (www.sciencemag.org).

Liu, L., "Design, Fabrication, and Characterization of Nano-Phontonic Components Based on Silicon and Plasmonic Material," Doctoral Thesis in Microelectronics and Applied Physics, 2006, pp. 1-88, Stockholm, Sweden.

Lu, Z., et al., "Three-Dimensional Subwavelength Imaging by a Photonic-Crystal Flat Lens Using Negative Refraction at Microwave Frequencies," Physical Review Letters, Oct. 7, 2005, The American Physical Society, PRL 95, pp. 1-4.

Mühlschlegel, P., et al., "Resonant Optical Antennas," Science, Jun. 10, 2005, vol. 308, pp. 1607-1609, (www.sciencemag.org).

Ozbay, E., Plasmonics: Merging Photonics and Electronics at Nanoscale Dimensions, Science, Jan. 13, 2006, vol. 311, pp. 189-193, (www.sciencemag.org).

Pala, R., et al., "A Nonvolatile Plasmonic Switch Employing Photochromic Molecules," Nano Letters, Published on web, Apr. 16, 2008, American Chemical Society, vol. 8, No. 5, pp. 1506-1510.

Pile, D., et al., "Adiabatic and Non-Adiabatic Nano-Focusing of Plasmons by Tapered Gap Plasmon Waveguides," Applied Physics Letters, 2006, American Institute of Physics, pp. 1-14, accessed from, http://eprints.qut.edu.au.

Shin, H., et al., "All-Angle Negative Refraction for Surface Plasmon Waves Using a Metal-Dielectric-Metal Structure," Physical Review Letters, Feb. 24, 2006, The American Physical Society, PRL 96, pp. 1-4.

Soljacic, M., et al., "Photonic-crystal slow-light enhancement of nonlinear phase sensitivity," Optical Society of America, Sep. 2002, J. Opt. Soc. Am. B, vol. 19, No. 9, pp. 2052-2059.

Stockman, M., "Nanofocusing of Optical Energy in Tapered Plasmonic Waveguides," Physical Review Letters, Sep. 24, 2004, The American Physical Society, vol. 93, No. 13, pp. 1-4.

Verhagen, E., et al., "Nanofocusing in laterally tapered plasmonic waveguides," Optics Express, Jan. 7, 2008, vol. 16. No. 1, pp. 45-57.

Veronis, G., et al., "Bends and splitters in metal-dielectric-metal subwavelength plasmonic waveguides," Applied Physics Letters, Apr. 22, 2005, American Institute of Physics, pp. 1-3.

Veronis, G., et al., "Guided subwavelength plasmonic mode supported by a slot in a thin metal film," Optics Letters, Dec. 15, 2005, Optical Society of America, vol. 30, No. 24, pp. 3359-3361.

Veronis, G., et al., "Modes of Subwavelength Plasmonic Slot Waveguides," Journal of Lightwave Technology, Sep. 9, 2007, vol. 25, No. 9, pp. 2511-2521.

Veronis, G., et al., "Theoretical investigation of compact couplers between dielectric slab waveguides and two-dimensional metal-dielectric-metal plasmonic waveguides," Optics Express, Feb. 5, 2007, vol. 15, No. 3, pp. 1211-1221.

Weeber, J., et al., "Optical near-field distributions of surface plasmon waveguide modes," Physical Review B., Jun. 19, 2003, pp. 1-25.

Yang, R., et al., "Efficient 3D Nanofocusing Based on Surface Plasmon Polaritons," Optical Society of America, 2008, pp. 1-3.

Yang, R., et al., "Efficiently squeezing near infrared light into a 21nm-by-24nm nanospot," Optics Express, Nov. 24, 2008, Optical Society of America, vol. 16, No. 24, pp. 20142-20148.

Yin, L., et al., "Subwavelength Focusing and Guiding of Surface Plasmons," Nano Letters, Published on web, Jun. 8, 2005, American Chemical Society, vol. 5, No. 7, pp. 1399-1402.

Heras, C., et al., "Direct measurement of frequency and polarization dependences of cross-phase modulation in fibers from high-resolution optical spectra," Optical Letters, Jan. 1, 2006, Optical Society of America, vol. 31, No. 1, pp. 1-4.

Garcia-Vidal, F., et al., "Multiple Paths to Enhance Optical Transmission through a Single Subwavelength Slit," Physical Review Letters, May 30, 2003, The American Physical Society, vol. 90, No. 21, pp. 1-4.

"FDTD Solutions Getting Started-Release 6.5", Reference Guide, Lumerical Solutions, Inc, 2003-2009, Vancouver, British Columbia, Canada, (http://www.lumerical.com).

"Mode Solutions Reference Guide, Release 5.0", Lumerical Solutions Inc., 2003-2012, pp. 19-26, Vancouver, British Columbia, Canada, (http://www.lumerical.com).

* cited by examiner

METHODS FOR THREE-DIMENSIONAL NANOFOCUSING OF LIGHT AND SYSTEMS THEREOF

This application claims the benefit of U.S. Provisional Patent Application Ser. No. 61/111,597, filed Nov. 5, 2008, which is herein incorporated by reference in its entirety.

FIELD OF THE INVENTION

The present invention generally relates to methods and systems for focusing light and, more particularly, to methods for efficient plasmonic nano-tapering for three-dimensional nanofocusing of light and systems thereof.

BACKGROUND

E. N. Economou, "Surface Plasmons in Thin Films," *Phys. Rev.* 182:539 (1969); A. Taflove, "Computational Electromagnetics: The Finite-Difference Time-Domain Method," Boston, Mass.: Artech House (1995); Veronis and Fan, "Bends and Splitters in Metal-Dielectric-Metal Subwavelength Plasmonic Waveguides," *Appl. Phys. Lett.* 87:131102 (2005); Pile and Gramotnev, "Adiabatic and Nonadiabatic Nanofocusing of Plasmons by Tapered Gap Plasmon Waveguides," *Appl. Phys. Lett.* 89:041111 (2006); and Heras, et al., "Direct Measurement of Frequency and Polarization Dependences of Cross-Phase Modulation in Fibers From High-Resolution Optical Spectra," *Opt. Lett.* 31:14 (2006), are herein incorporated by reference in their entirety.

The ability to squeeze light to be ultra small is critical to high density optical interconnection, sensitive modulators, optical data storage, compact sensors, manipulation of nanostructures, sharper microscopy, and optical lithography in semiconductor industry. The extremely high light intensity resulting from the ultra small spot will greatly increase the nonlinear effect and can be used to make ultra small and ultra fast electric-optic or all-optic modulators. Recent progress in plasmonics offers new insight into this topic. (E. Ozbay, "Plasmonics: Merging Photonics and Electronics at Nanoscale Dimensions," *Science* 311:189 (2006); Barnes et al., "Surface Plasmon Subwavelength Optics," *Nature* (London) 424:824 (2003), which are hereby incorporated by reference in their entirety).

Currently, there are two approaches to squeeze light into a subwavelength scale using plasmon-based media. The first one is based on the small mode size that is supported by plasmon-based media in which light can be squeezed into a subwavelength aperture or propagated in a subwavelength waveguide. Directly coupling light into a deep subwavelength circular or square aperture has been tried and shown to have very low efficiency. As a result, more recent work has focused on transmitting light through deep subwavelength slits or coupling light into waveguides with deep subwavelength dimension only in one direction.

Extraordinary optical transmission was first observed through arrays of subwavelength holes. Each hole has a diameter (150 nm) slightly smaller than the diffraction limit of light ($\lambda$=326 nm) (Ebbesen et al., "Extraordinary Optical Transmission Through Sub-Wavelength Hole Arrays," *Nature* (London) 391:667 (1998), which is hereby incorporated by reference in its entirety). The transmission through the aperture can be enhanced by fabricating periodic grooves surrounding the apertures (García-Vidal et al., "Multiple Paths to Enhance Optical Transmission through a Single Subwavelength Slit," *Phys. Rev. Lett.* 90:213901 (2003), which is hereby incorporated by reference in its entirety).

Following the same principle, beaming light from a single subwavelength aperture was reported (Lezec et al., "Beaming Light from a Subwavelength Aperture," *Science* 297:820 (2002), which is hereby incorporated by reference in its entirety). Two types of apertures were used in this work: a circular aperture with diameter 250 nm, which is slightly smaller than the diffraction limit for visible light and a slit aperture with deep subwavelength dimension in one direction, 40 nm, but in another dimension 4400 nm. If another deep subwavelength confinement by metal is applied, a cutoff frequency will be imposed and the transmission is extremely small. Resonant optical antennas considerably shorter than one-half the wavelength were shown to enhance field in the antenna feed gap and lead to white-light supercontinuum generation (Muhlschlegel et al, "Resonant Optical Antennas," *Science* 308:1607 (2005), which is hereby incorporated by reference in its entirety). However, the low coupling efficiency and side lobes constitute significant drawbacks for practical applications.

Light propagation along a chain of gold particles with dimensions 100×100×40 nm$^3$ deposited on an ITO substrate was observed in the visible light regime ($\lambda$=633 nm) (Krenn et al., "Squeezing the Optical Near-Field Zone by Plasmon Coupling of Metallic Nanoparticles," *Phys. Rev. Lett.* 82:2590 (1999), which is hereby incorporated by reference in its entirety). Yin et al. (Yin et al., "Subwavelength Focusing and Guiding of Surface Plasmons," *Nano Lett.* 5:1399 (2005), which is hereby incorporated by reference in its entirety), demonstrated light ($\lambda$=532 nm) guiding along a silver strip with a cross section of 250×50 nm$^2$. There is also a report on very low-loss light propagation (~100 µm) along triangular 0.6 µm wide and 1 µm deep gold grooves at a telecom wavelength (Bozhevolnyi et al., "Channel Plasmon-Polariton Guiding by Subwavelength Metal Grooves," *Phys. Rev. Lett.* 95:046802 (2005), which is hereby incorporated by reference in its entirety). Numerical simulation of a nanowire taper (M. I. Stockman, "Nanofocusing of Optical Energy in Tapered Plasmonic Waveguides," *Phys. Rev. Lett.* 93:137404 (2004), which is hereby incorporated by reference in its entirety) and experimental demonstration of a planar taper (Verhagen et al., "Nanofocusing in Laterally Tapered Plasmonic Waveguides," *Opt. Express* 16: 45 (2008), which is hereby incorporated by reference in its entirety) were recently reported, where photons are converted into surface plasmon polaritons and propagate along the surface of a tapered nanowire or waveguide. However, how to efficiently couple light into such a chain, groove, and tapers, as well as how to decrease surface scattering are problems remaining unsolved.

The other approach to squeeze light subwavelength is based on negative refraction by plasmon-based media. Negative refraction can be employed to amplify and restore evanescent waves, which carry the fine information of the object, making super imaging resolution (Shin and Fan, "All-Angle Negative Refraction for Surface Plasmon Waves Using a Metal-Dielectric-Metal Structure," *Phys. Rev. Lett.* 96:073907 (2006); Lu et al., "Three-Dimensional Subwavelength Imaging by a Photonic-Crystal Flat Lens Using Negative Refraction at Microwave Frequencies," *Phys. Rev. Lett.* 95:153901 (2005), which are hereby incorporated by reference in their entirety). Sub-diffraction-limited optical imaging was obtained with a silver superlens by negative refraction with resolution of $\lambda$/6 ($\lambda$=365 nm). However, subwavelength images themselves require subwavelength objects (Fang et al., "Sub-Diffraction-Limited Optical Imaging with a Silver Superlens," *Science* 308:534 (2005), which is hereby incorporated by reference in its entirety).

On the other hand, efficient light coupling from dielectric waveguides into plasmonic waveguides was numerically investigated in recent work. The key issue is to match the effective transmission cross section (determined by impedance and mode profile) of the plasmonic waveguides. It has been shown that the effective transmission cross section of a metal-dielectric-metal (MDM) waveguide is surprisingly much larger than the geometrical dimension of the dielectrics between metal slabs. This helps the transmission cross section match between a dielectric waveguide and MDM waveguide. The reason for this is still not completely clear. The light transmission enhancement on nanoscale antennas or by periodic textures may partially explain the high transmission (Muhlschlegel et al., "Resonant Optical Antennas," *Science* 308:1607 (2005); Lezec et al., "Beaming Light from a Subwavelength Aperture," *Science* 297:820 (2002); Gay et al., "The Optical Response of Nanostructured Surfaces and the Composite Diffracted Evanescent Wave Model," *Nature Phys.* 2:262 (2006); Weeber et al., "Optical Near-Field Distributions of Surface Plasmon Waveguide Modes," *Phys. Rev. B* 68:115401 (2003), which are hereby incorporated by reference in their entirety). Two-dimensional finite-difference time-domain (FDTD) simulations were performed (Veronis and Fan, "Theoretical Investigation of Compact Couplers Between Dielectric Slab Waveguides and Two-Dimensional Metal-Dielectric-Metal Plasmonic Waveguides," *Opt. Express* 15:1211 (2007), which is hereby incorporated by reference in its entirety) for light direct coupling from a dielectric waveguide into an MDM waveguide with efficiency 68% (including propagation loss). The two-dimensional (2D) simulations promise to be valid for plasmonic waveguides with large dimensions in the third direction.

These research results are exciting and indeed constitute breakthroughs towards deep subwavelength photonics. However, they either provide deep subwavelength dimension only in one direction, or need the assistance of periodic textures, or require very complicated coupling configurations.

DETAILED DESCRIPTION

The present invention relates to a nanofocusing system including a dielectric waveguide having two opposing ends; and a metal-dielectric-metal layered waveguide having two opposing ends optically center-aligned at one end with one end of the dielectric waveguide. The metal-dielectric-metal waveguide tapers in at least one dimension from the aligned end of the metal-dielectric-metal waveguide towards the opposing end. Light travelling through the dielectric waveguide is funneled into the dielectric layer of the metal-dielectric-metal waveguide, squeezed by the metal-dielectric-metal waveguide taper, and exits the metal-dielectric-metal waveguide as nanofocused light.

The present invention also relates to a method for nanofocusing light including passing light through a dielectric waveguide; confining the light in a first dimension by coupling the light from the dielectric waveguide into a metal-dielectric-metal waveguide; squeezing in a second dimension the light confined in the first dimension by passing the light through a taper in the metal-dielectric-metal waveguide; wherein the light is three-dimensionally reduced to a nanoscale spot.

The present invention also relates to a method for making a nanofocusing system including defining an outline for a metal-dielectric-metal waveguide in one or more materials on a substrate. At least one metal layer is deposited in the outline. At least one dielectric layer is deposited on the at least one metal layer in the outline. At least one other metal layer is deposited on the at least one dielectric layer in the outline to form the metal-dielectric-metal waveguide. Another outline for a dielectric waveguide is defined with one end of the another outline adjacent one end of the metal-dielectric-metal waveguide in one or more of the materials on the substrate. At least one other dielectric layer is deposited in the another outline to from the dielectric waveguide.

The present invention also relates to a method for making a nanofocusing system including fabricating a dielectric waveguide. A metal-dielectric-metal waveguide is separately fabricated. One end of the dielectric waveguide is aligned with one end of the metal-dielectric-metal waveguide. The aligned end of the dielectric waveguide is bonded with the end of the metal-dielectric-metal waveguide.

The present invention provides a nanofocusing system to efficiently and three-dimensionally squeeze light from a dielectric waveguide into a nanoscale spot. The present invention can nanofocus a light source in the ultra violet to near infrared range (100 nm to 10 µm), and preferably visible to near infrared range (365 nm to 1600 nm). The present invention utilizes: (1) the surprisingly high efficiency that can be achieved by directly coupling light from a dielectric waveguide into a metal-dielectric-metal plasmonic waveguide; and (2) a 3D nanoscale (e.g., 20 nm-by-20 nm) metal-dielectric-metal plasmonic waveguide with a large dielectric constant contrast that supports a small size mode with acceptably low loss (effective index is very small). As described herein, the terms "horizontal" and "vertical" are used to describe the relative orientation of the components to each other and are not to be taken as limitations in the absolute sense.

Figure 1:
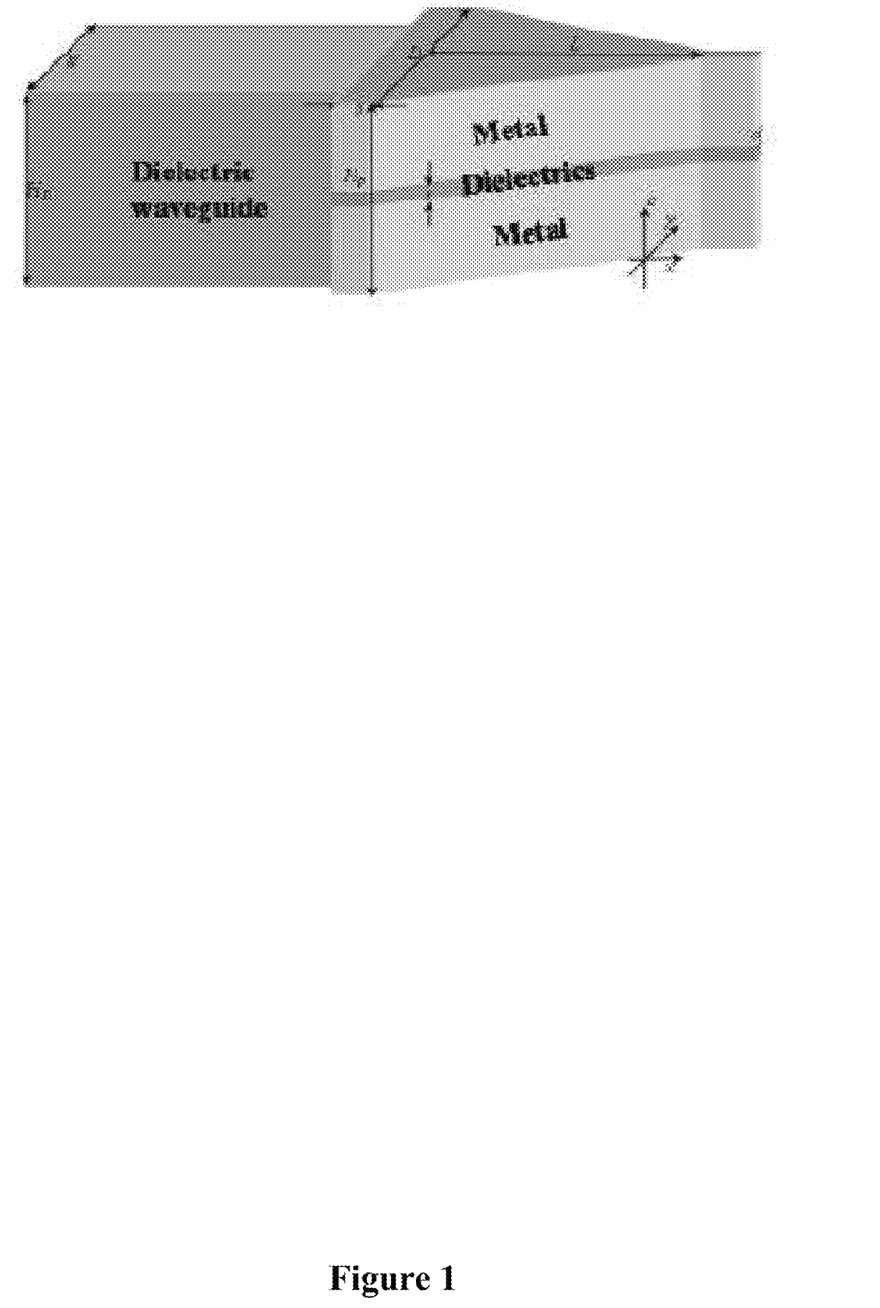
FIG. 1 is a perspective view of a nanofocusing system in accordance with embodiments of the present invention.

As shown in FIG. 1, the nanofocusing system in accordance with embodiments of the present invention includes a dielectric waveguide and a nanoscale metal-dielectric-metal (MDM) plasmonic taper. In one exemplary embodiment, the dielectric waveguide includes a layer of silicon (Si, $\in_r$=12.25) with a width L=320 nm and height $H_D$=300 nm, although the dielectric waveguide could be made of other materials and have other dimensions. The uniform transient MDM plasmonic waveguide, with overall dimension D=400 nm and $H_p$=400 nm, and dielectrics ($SiO_2$, $\in_r$=2.25) thickness t=20 nm sandwiched between two metal (e.g. silver) slabs, is seamlessly placed beside the dielectric waveguide. These dielectric and MDM plasmonic waveguides are aligned at the center. Following the uniform MDM plasmonic waveguide, a taper is applied to decrease the width of the MDM plasmonic waveguide gradually from D=400 nm to 20 nm in the horizontal plane, with the thickness of both silver slabs and dielectric films preserved. Although silver slabs are disclosed, other low loss metals can be used, such as gold, by way of example only. The output is characterized as a 20 nm-by-20 nm dielectric tip. The tapering region has a length of L=550 nm.

Dielectric materials suitable for use in the dielectric waveguide include solid-state semiconductor materials used in semiconductor technology, such as silicon, silicon dioxide, silicon nitride, and the like, and also transparent polymers for certain wavelengths. For near infrared light, silicon is the most preferred competent material for making a dielectric waveguide.

Suitable materials for use in the MDM plasmonic waveguide include noble metals with transparent dielectrics. Gold, silver, aluminum are preferred metal cladding for the MDM configuration. Silicon dioxide or transparent polymer (for certain wavelengths) are preferred candidates as the core material. Most preferred is gold with silicon oxide.

The overall dimensions at the MDM/dielectric waveguide interface of the MDM waveguide, e.g., D=400 nm and $H_p$=400 nm, are designed to be larger than the overall dimensions of the dielectric waveguide, e. g., width L=320 nm and height $H_D$=300 nm, to eliminate the transmission through edges of both the dielectric core and metal cladding of the MDM. This is essentially the configuration of light coupling from a dielectric waveguide into a nanoscale slit if the length of the plasmonic waveguide is very small.

Once light is coupled into the nanoscale MDM plasmonic waveguide, very good confinement can be achieved in the vertical direction when the light travels from the dielectric waveguide to the MDM plasmonic waveguide. Light is squeezed in the vertical plane as it enters the MDM plasmonic waveguide, this is referred to as funneling of the light. The size of the mode in the vertical direction, determined by the geometric thickness of the dielectrics and the evanescent tails (<1 nm in this case) in the surrounding metal slabs, is calculated to be 21 nm in accordance with one embodiment.

To achieve nanofocusing in the horizontal direction, the integrated taper in the horizontal plane is introduced into the system, as shown in FIG. 1. The integrated taper is surrounded by air and nanoscale guided modes propagating in the MDM can be supported (i.e., smaller spot size can be obtained). Between the silicon waveguide and the plasmonic taper there is a section of uniform transient plasmonic waveguide (δ=50 nm), as shown in FIG. 1. The dimension of the nano-focused optical mode is 5 to 100 nm, preferably 10 to 20 nm. By combing the input silicon waveguide, the finite-difference time-domain (FDTD) simulation of the 3D structure is repeated.

EXAMPLE

A 3D FDTD simulation of light (λ=1550 nm) coupling from a dielectric waveguide (Si, $\in_r$=12.25) with width L=320 nm and height $H_D$=300 nm into a plasmonic waveguide with dielectrics ($SiO_2$, $\in_r$=2.25) thickness t=20 nm sandwiched between two silver slabs was performed. A plasmon dispersion model was applied in the simulation with dielectric constant of silver based on Johnson and Christy, "Optical Constants of Noble Metals," *Phys. Rev.* B 6:4370 (1972), which is hereby incorporated by reference in its entirety, $\in_r$=−129−3.2j, and set in a commercialized software package (FDTD Solutions-Release 5.0, Lumerical Solutions, Inc, Vancouver, British Columbia, Canada). In particular, a nonuniform orthogonal grid with mesh size 1 nm in the plasmonic waveguide to satisfy accuracy in allowed computation capability was used. The coupling efficiency was found to be 81% excluding the propagation loss in the plasmonic waveguide. Coupling efficiency can be improved to over 90% with suitably designed multisection tapers. On the other hand, the coupling efficiency will be very poor if the dimension in the horizontal direction is simultaneously deep subwavelength because this will decrease the effective transmission cross section of the DMD plasmonic waveguide.

In the present nanofocusing system including the dielectric waveguide and the nanoscale MDM plasmonic taper, the squeezing process includes the following steps: (1) vertical confinement is achieved by efficiently coupling light from a dielectric waveguide into a 20-nm metal-dielectric-metal plasmonic waveguide; (2) the horizontal dimension of the plasmonic waveguide is then tapered into 20 nm. In the coupling process, the vertical dimension is shrunk; in the tapering process, the horizontal dimension is squeezed.

The MDM plasmonic waveguide supports light propagation with ultra small mode size and acceptable propagation loss (due to huge dielectric constant difference), so that efficient horizontal (y-direction) nanofocusing can be achieved by an integrated taper. The MDM plasmonic waveguide is used to decrease the surface scattering.

The effective transmission cross section of an MDM waveguide is surprisingly much larger than the geometrical dimension of the dielectrics between the metal slabs. This helps the transmission cross section match between a dielectric waveguide and an MDM plasmonic waveguide. The light transmission enhancement on nanoscale antennas or by periodic textures may partially account for the high transmission. In particular, the surface plasmon polaritons (SPPs) at the coupling boundary play a key role in improving the efficiency.

The light wave from the dielectric waveguide excites SPPs along the dielectric-plasmonic boundaries and the SPPs will be "funneled" into the MDM plasmonic waveguide. SPPs can propagate along sharp bends with low loss. To demonstrate this clearly, the location of the MDM plasmonic waveguide can be intentionally misaligned with the dielectric waveguide.

Figure 2A:
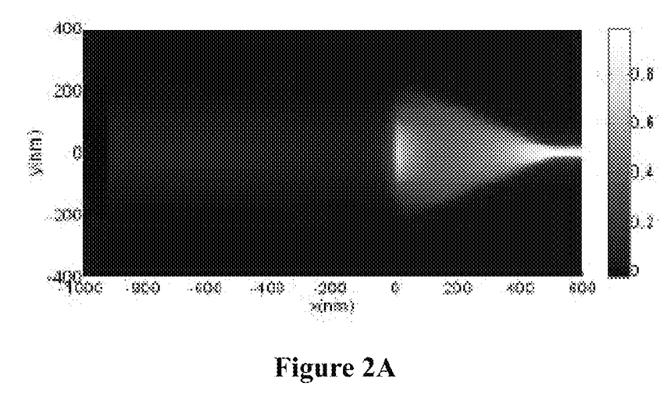
FIG. 2A is a graph of an Sx distribution in a horizontal plane for a simulation of light coupling from a dielectric waveguide into an MDM plasmonic taper.
Figure 2B:
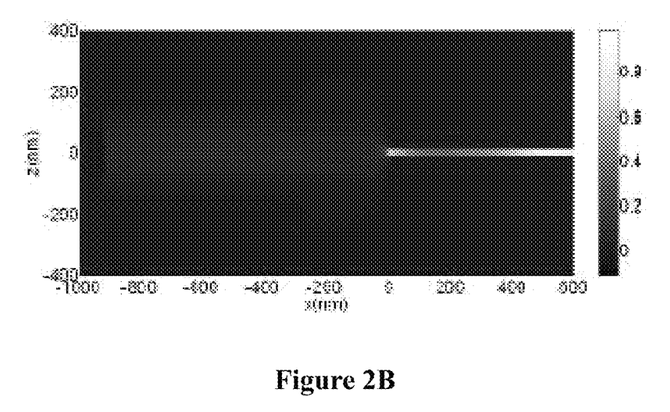
FIG. 2B is a graph of an Sx in the vertical plane for the simulation of light coupling from the dielectric waveguide into the MDM plasmonic taper.

Referring to FIGS. 2A-2B, $S_x$, power flow distribution along the propagation direction, in the horizontal (z=0) and vertical (y=0) planes, respectively, is illustrated. The MDM plasmonic taper gathers a large amount of power from the dielectric waveguide and the power density becomes progressively stronger when light propagates toward the taper tip.

Figure 2C:
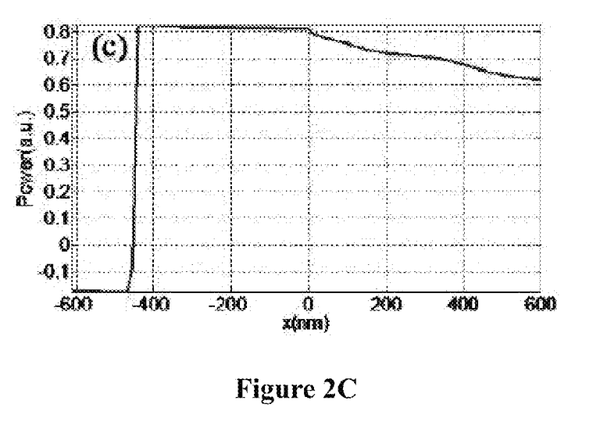
FIG. 2C is a graph of an x-component of power flow (Px) along the x-axis for the simulation of light coupling from a dielectric waveguide into an MDM plasmonic taper.

As shown in FIG. 2C, by integrating $S_x$ in the dielectric waveguide and the plasmonic waveguide taper and considering the back-reflection (negative value, 18%) from their interface, the overall efficiency (including propagation loss) is 62%. About 20% of power accounts for the transverse scattering at the interface and propagation loss in the MDM plasmonic taper.

Figure 3A:
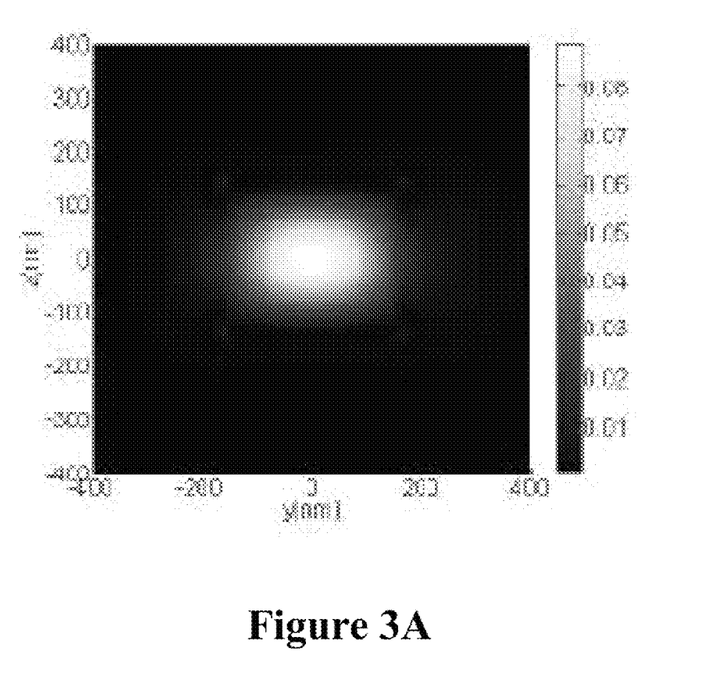
FIGS. 3A-3D are graphs of spot size at different locations along the x-axis of the nanofocusing system.
Figure 3B:
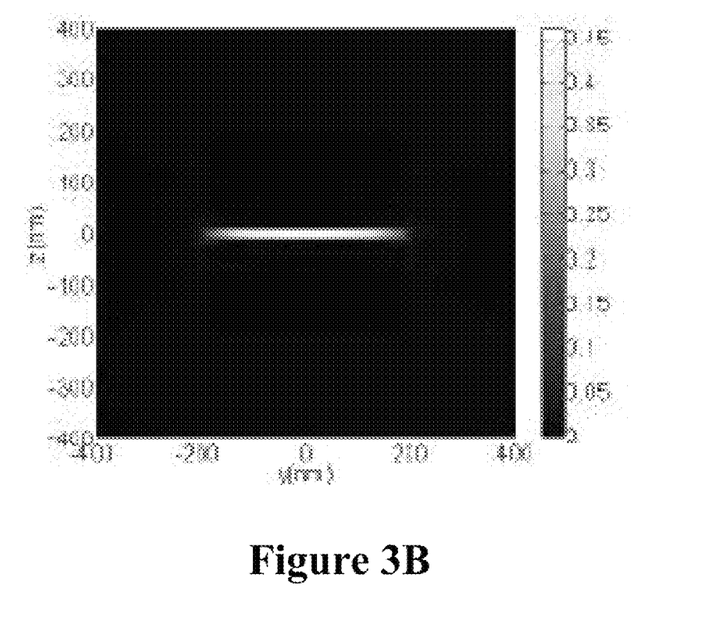
Figure 3C:
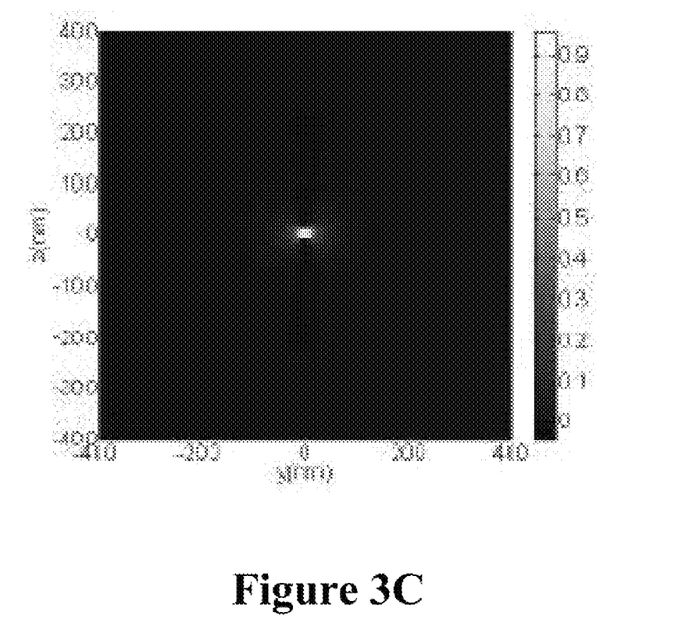
Figure 3D:
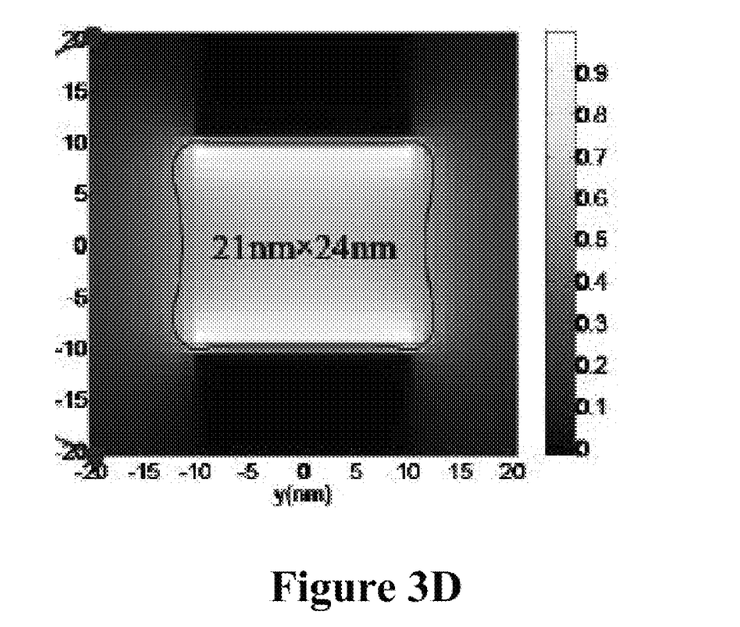

Referring to FIGS. 3A-3C, $S_x$ in the dielectric waveguide, in the transient plasmonic waveguide, and at output ports, respectively, is illustrated. As can be seen, the light power from the silicon waveguide is focused into a nanospot in both horizontal and vertical directions after the two-step squeezing process. In the coupling process, the vertical dimension is shrunk; in the tapering process, the horizontal dimension is squeezed. The dimensions of the spot at the output port are measured by full width at half maximum to be 21 nm in the vertical direction and 24 nm in the horizontal direction, which are close to the mode dimensions of a 20 nm-by-20 nm silver-$SiO_2$-silver plasmonic waveguide. In the present invention, the taper functions as a mode converter from a mode with large dimension (~320 nm) into a mode with small dimension (24 nm) in the horizontal direction. The MDM plasmonic waveguide, even with dimensions 20 nm-by-20 nm, supports a fundamental bound mode with size almost completely dominated by the near field of the waveguide. Due to large magnitude difference between the dielectric constant of the dielectrics ($\in_r$=2.25) and that of silver ($\in_r$=−129−3.2j) at $\lambda$=1550 nm, the effective index of the plasmonic waveguide is very small (Veronis and Fan, "Modes of Subwavelength Plasmonic Slot Waveguides," *J. Lightw. Techno.* 25:2511 (2007); Veronis and Fan, "Guided Subwavelength Plasmonic Mode Supported by a Slot in a Thin Metal Film," *Opt. Lett.* 30:3359 (2005), which are hereby incorporated by reference in their entirety).

Figure 4A:
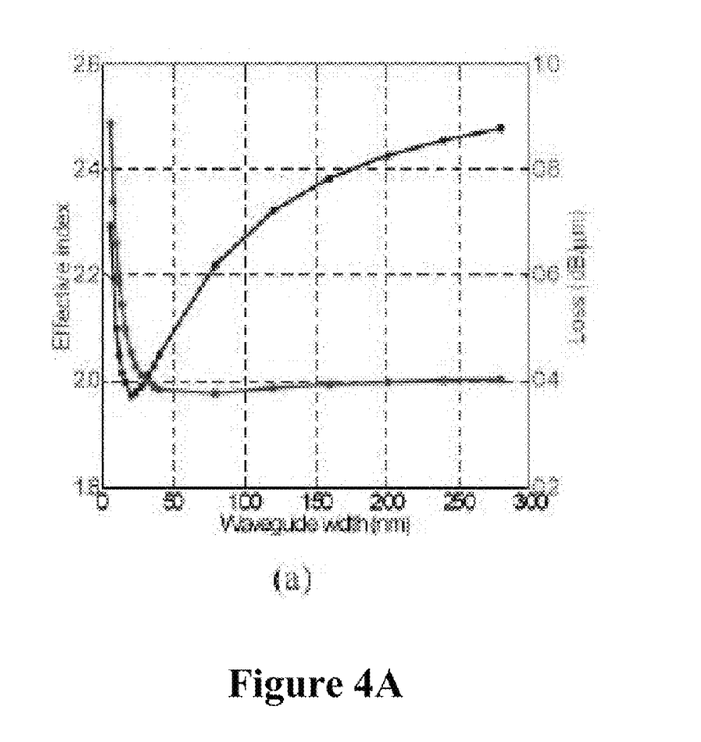
FIG. 4A is a graph of an effective index and loss for a 20 nm thick MDM plasmonic waveguide with different widths.
Figure 4B:
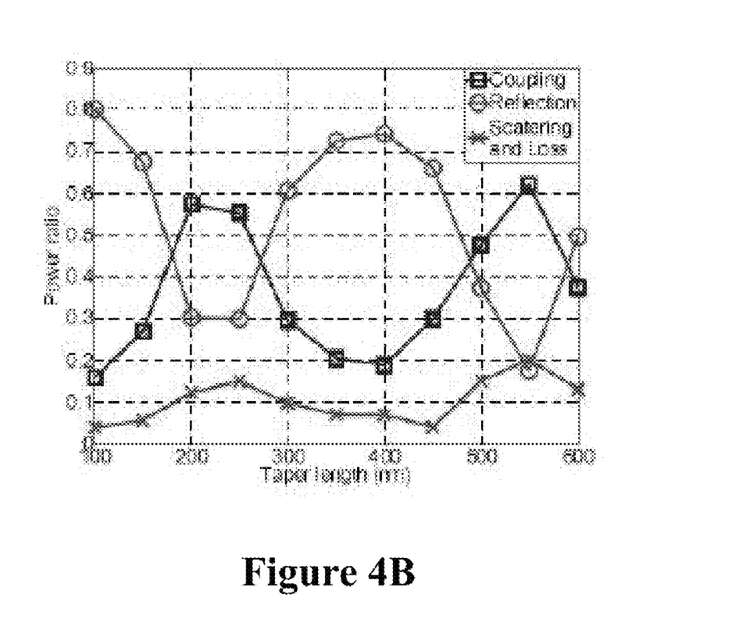
FIG. 4B is a graph of overall efficiency for tapers with different lengths.
Figure 5A:
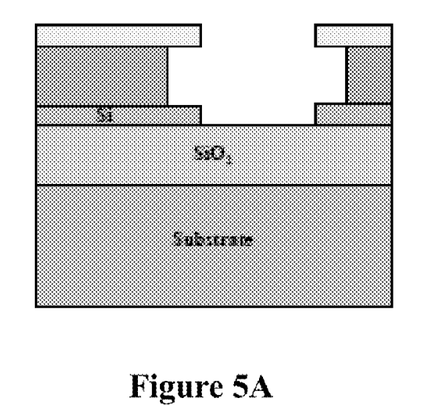
FIGS. 5A-5H are side, cross-sectional and top views of a method for manufacturing a nanofocusing system in accordance with embodiments of the present invention.
Figure 5B:
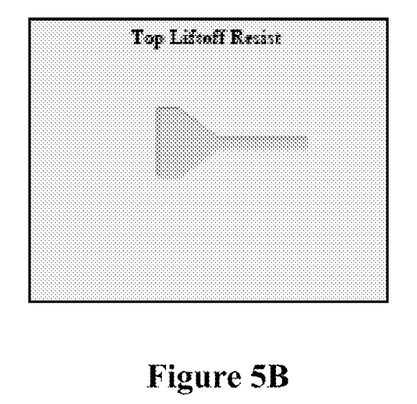
Figure 5C:
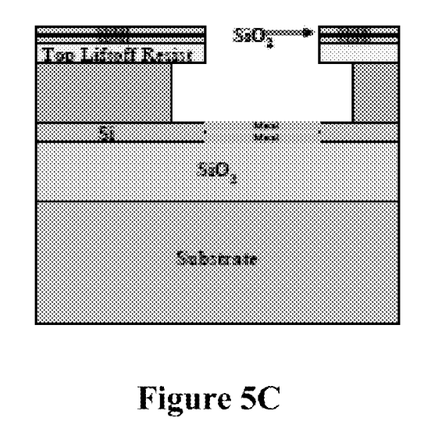
Figure 5D:
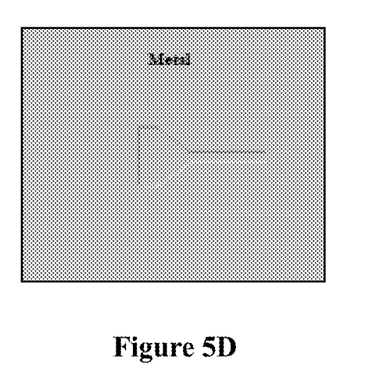
Figure 5E:
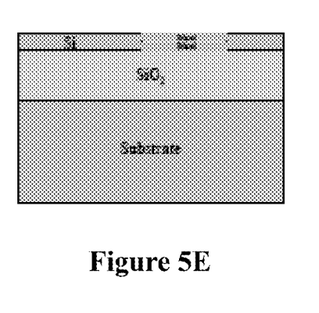
Figure 5F:
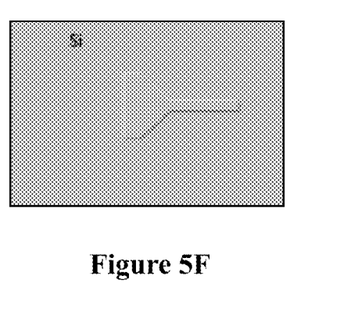
Figure 5G:
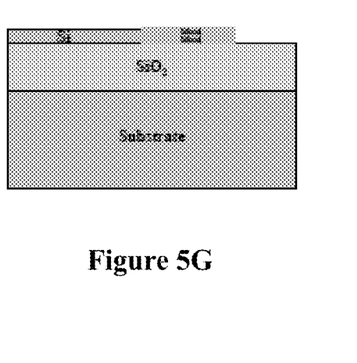
Figure 5H:
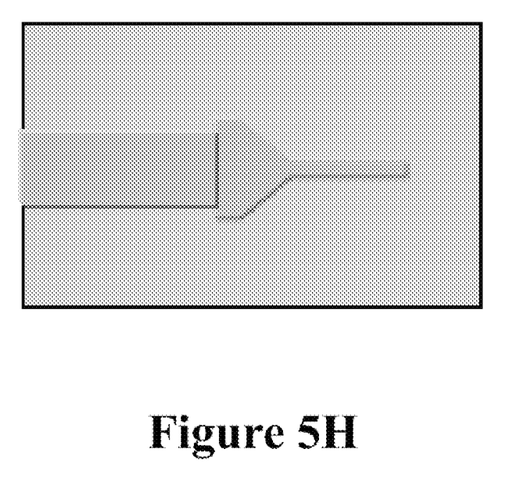

As a result, the propagation loss in the taper can be controlled in an acceptable range as shown in FIG. 4A. Note the propagation distance in the MDM plasmonic waveguide, even with dimensions 20 nm-by-20 nm (with propagation loss 0.45 dB/μm), can run up to several micrometers. Although shorter tapers may help decrease the total propagation loss, the shorter tapers will result in larger back reflection. Referring to FIG. 4B, the relation between the taper length and the efficiency is illustrated. In addition to the obvious Fabre-Perot effect, there is a tradeoff between taper length and propagation loss.

A feature of the present invention is that it is a planar structure and can be fabricated with standard semiconductor techniques as illustrated in FIGS. 5A-5H. The patterns of the dielectric waveguide and plasmonic taper can be defined by electron-beam lithography and dry etch. The three-layer DMD plamonic taper can be formed following a layer-by-layer deposition. A bilayer photoresist process (L. Liu, "Design, Fabrication, and Characterization of Nano-Photonic Components Based on Silicon and Plasmonic Material", *Doctoral Thesis in Microelectronics and Applied Physics*, Stockholm, Sweden, 2006 (which is hereby incorporated by reference in its entirety) can be applied to easily lift off the deposited materials on the photoresist. Since the present invention can be fabricated with standard semiconductor techniques, the present invention can be utilized in a large variety of applications, such as in optical data storage, sensitive modulators, compact sensors, manipulation of nanostructures, sharper microscopy, and optical lithography in the semiconductor industry.

Figure 6:
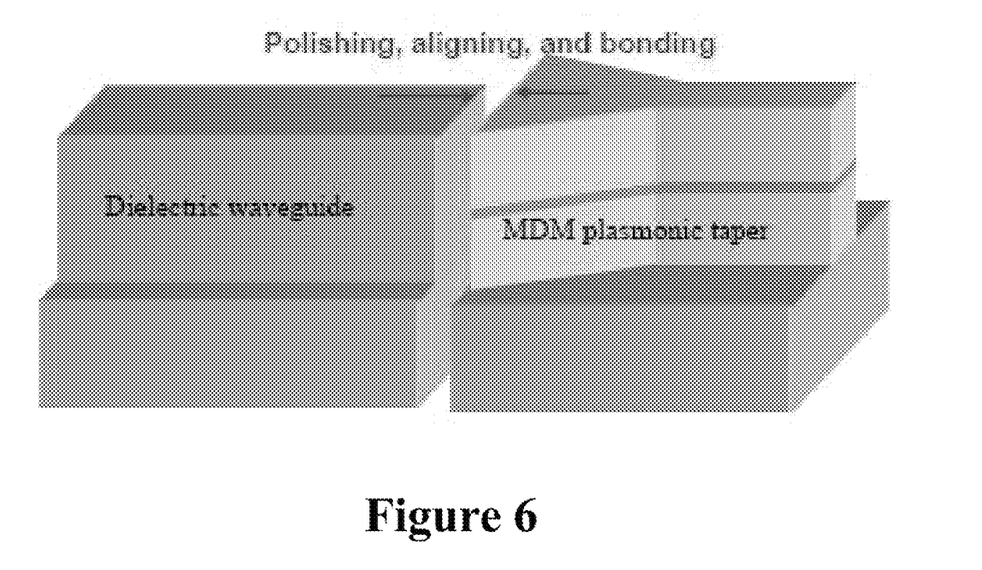
FIG. 6 is a perspective view of another exemplary method for manufacturing a nanofocusing system in accordance with embodiments of the present invention.

Although the bi-layer photoresist process has been widely used and proven to be very effective, other methods for making the nanofocusing system can be used. For example, an alternative approach to fabricate the 3D nanosqueezing plasmonic taper is described and shown in FIG. 6. In this approach, the dielectric waveguide and MDM plasmonic taper are fabricated, for example, using FIB milling, on two chips separately. Next, the contacting ends of the dielectric waveguide and MDM plasmonic taper are polished, aligned and bonded together, although other numbers and types of steps could be executed to make the nanofocusing system. This particular approach has the advantage of easy fabrication, although an additional polishing process is preferred and considerably good alignment is required.

Although the embodiments discussed herein are performed in the near infrared regime, similar results are expected in the visible light regime if the taper tip can support a guided mode. Thus, in a suitable frequency region light can be efficiently squeezed into a spot smaller than 10 nm-by-10 nm. The light intensity will increase hundreds of times from the input. In this case, the thermal effect and probably even quantum effect have to be taken into account.

Figure 7A:
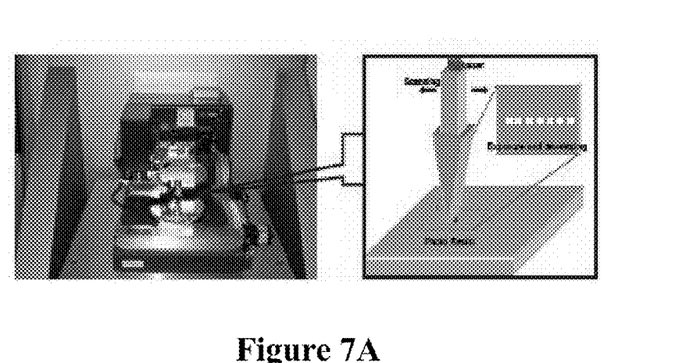
FIG. 7A is a perspective view of a nano-lithography system with the nanofocusing system in accordance with embodiments of the present invention.

With the present invention, a nano-optic beam may take over partial work currently done by expensive electron-beam lithography and focused ion beam milling as shown in FIG. 7A. In conventional optical systems, the mode size that light can be confined and the spot size that light can be focused are limited by the diffraction limit, which is roughly about 0.5 wavelength.

Figure 7B:
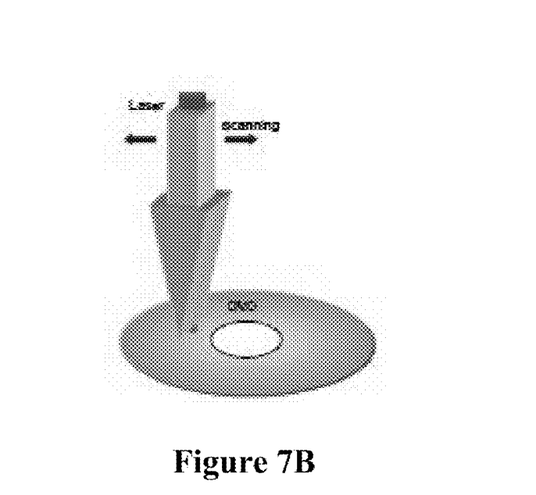
FIG. 7B is a perspective view of an optical storage system with the nanofocusing system in accordance with embodiments of the present invention.

Additionally, the present invention offers new insight into this topic: near infrared light (wavelength $\lambda$=1550 nm) can be efficiently squeezed into a 21 nm-by-24 nm or 0.0135$\lambda$-by-0.0155$\lambda$ spot. The application of this technique in optical storage may increase DVD capacity up to hundreds of terabits as shown in FIG. 7B.

Figure 7C:
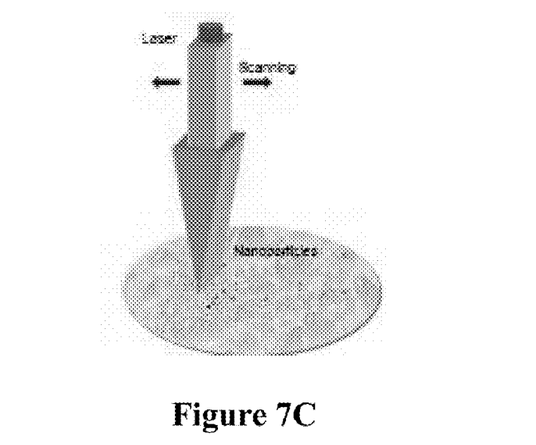
FIG. 7C is a perspective view of an optical tweezer with the nanofocusing system in accordance with embodiments of the present invention.

Further, with the present invention, more powerful optical tweezers can be designed to clamp single atoms or nanoparticles, where the radiation force essentially depends on the gradient of power density as shown in FIG. 7C.

Figure 7D:
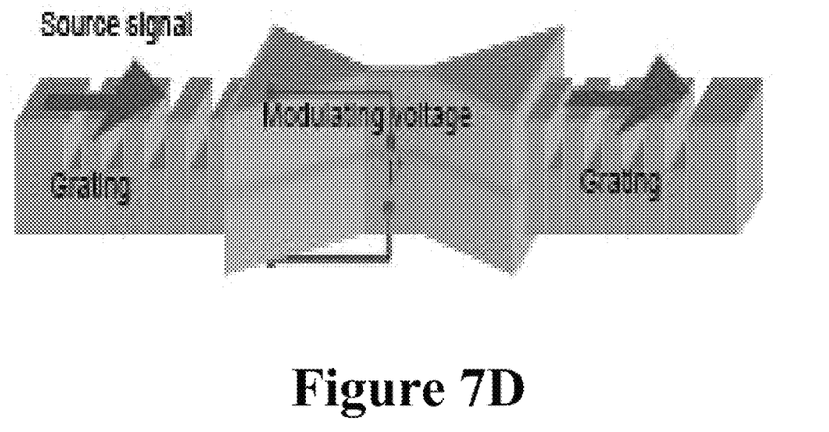
FIG. 7D is a perspective view of an electro-optical modulation system with the nanofocusing system in accordance with embodiments of the present invention.
Figure 7E:
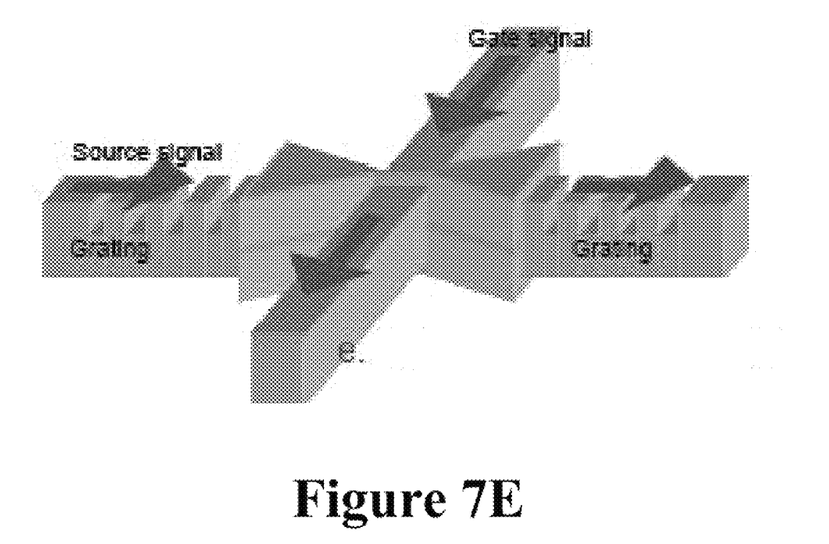
FIG. 7E is a perspective view of a low power all optical modulator with the nanofocusing system in accordance with embodiments of the present invention.

When the dielectrics thickness is 20 nm as discussed above, the effective index is small. On the other hand, when the slot size is shrunk down even smaller, a very large effective index can be achieved. The high light intensity and slow light effect in the air slot of the plasmonic waveguide can be used to make very compact sensors by introducing microring resonators or cavities. If a suitable nonlinear or photochromic polymer is deposited in the slot, low voltage modulators can be realized with the present invention as shown in FIG. 7D. Note that the gap between the anode and cathode is only several nanometers. The required modulating voltage will be much smaller than conventional electro-optic modulators. The enhanced nonlinear optical effect may be strong enough to enable all-optic modulation with the present invention as shown in FIG. 7E, i.e., one light beam is used to control the transmission of another light beam by introducing a high-Q grating or other resonant structures.

Figure 8A:
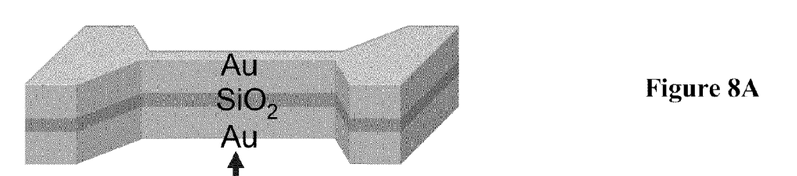
FIG. 8A is a perspective view of a nanofocusing system in accordance with embodiments of the present invention.
Figure 8B:
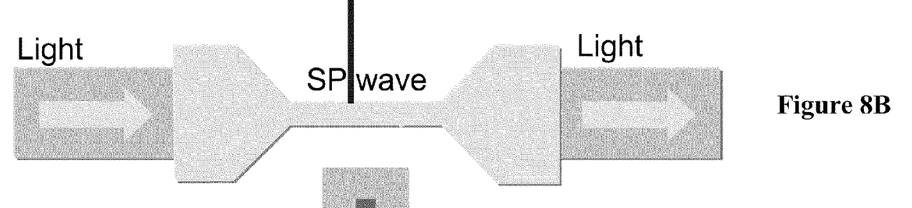
FIG. 8B is a top plan view of a nanofocusing system in accordance with embodiments of the present invention.
Figure 8C:
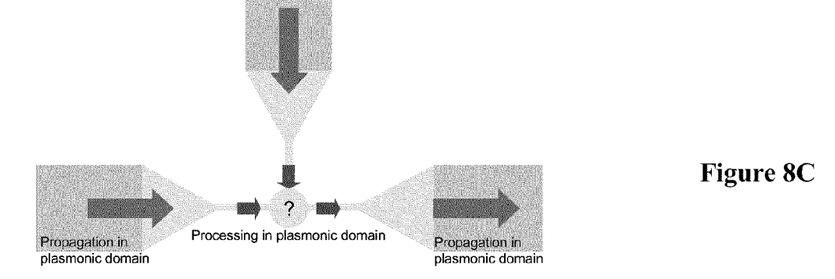
FIG. 8C is a top plan view of a nanofocusing system and processing node in accordance with embodiments of the present invention.

FIGS. 8A-C incorporate the 3D taper of the present invention. FIG. 8C is an application in which there is a "processing node" and several propagation channels. This application makes use of the tiny modal size when light goes through propagation channels and enters a processing node, and indicates a fast operation speed because of the low power needed to drive the nano-size processing node.

Figure 9A:
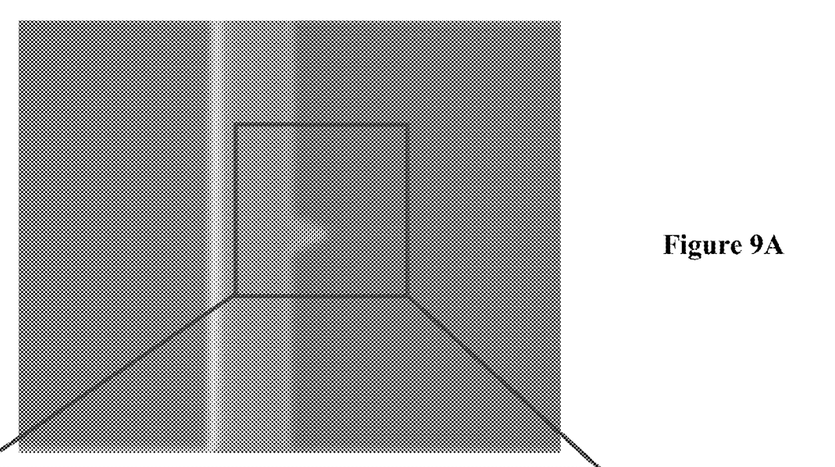
FIG. 9A is an inset of a fabrication of a plasmonic taper shown in FIG. 9B in accordance with embodiments of the present invention.
Figure 9B:
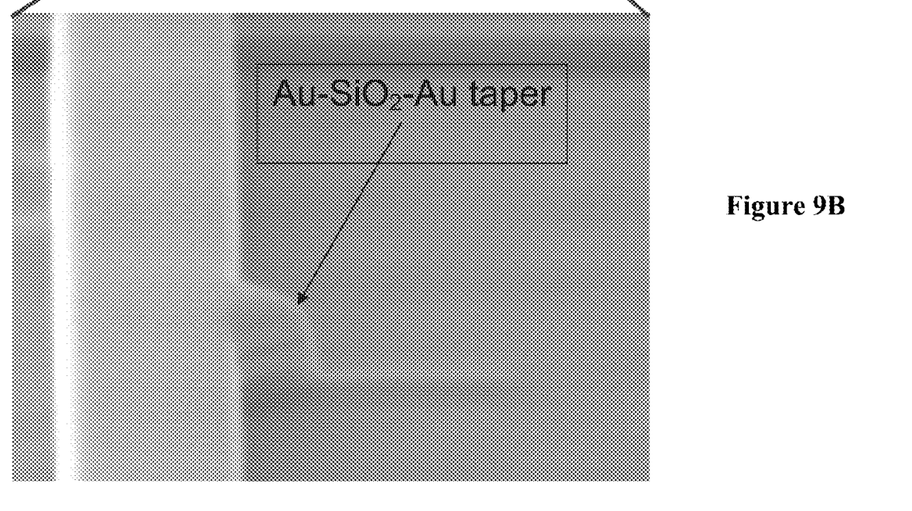
FIG. 9B is a fabrication of a three layer plasmonic taper without a dielectric waveguide in accordance with embodiments of the present invention.

FIG. 9A is an inset of FIG. 9B and shows preliminary fabrication results of a plasmonic taper. The part shown in FIG. 9B is a three layer taper structure, without a dielectric waveguide bonded thereto. FIG. 9B represents the actual size and dimension of the plasmonic tip, which is to be bonded with dielectric waveguides, or aligned in any scheme with an input source.

An optical head or near-field optical scanning tip, or other optical writing/reading apparatus, can be incorporated within the design of this invention by methods know to those of skill in the art. An optical head for near-field microscopy and reading/writing apparatus is a tiny tip that can radiate or detect very small amount of optical power, e.g., for use in data written onto a CD or DVD or onto hard drives. This embodiment features efficient power delivery to nano-dimension, and could potentially decrease the power consumption and system complexity (Yang and Lu, "Efficient 3D Nanofocusing Based on Surface Plasmon Polaritons," in *Plasmonics and Metamaterials*, OSA Technical Digest (CD) (Optical Society of America, Paper MThB6 (2008); Yang et al., "Efficiently Squeezing Near Infrared Light Into a 21 nm-by-24 nm Nanospot," *Opt. Express* 16(24):20141-20148 (2008), which are hereby incorporated by reference in their entirety).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A nanofocusing system comprising:
a dielectric waveguide having two opposing ends; and
a three-dimensional metal-dielectric-metal layered waveguide having two opposing ends optically aligned at one end with one end of the dielectric waveguide, wherein the three-dimensional metal-dielectric-metal waveguide tapers in at least two dimensions from the aligned end of the three-dimensional metal-dielectric-metal waveguide towards the opposing end, wherein light travelling through the dielectric waveguide is funneled in a first dimension of the at least two dimensions into the dielectric layer of the three-dimensional metal-dielectric-metal waveguide, squeezed in a second dimension of the at least two dimensions by the metal-dielectric-metal waveguide taper, and exits the three-dimensional metal-dielectric-metal waveguide as nanofocused light.

2. The system as set forth in claim 1, wherein the metal-dielectric-metal waveguide tapers in two dimensions from the aligned end of the metal-dielectric-metal waveguide towards the opposing end.

3. The system as set forth in claim 1, wherein the dielectric waveguide and the metal-dielectric-metal waveguide are optically aligned substantially along the center.

4. The system as set forth in claim 1, wherein the dielectric waveguide is a dielectric slab waveguide.

5. The system as set forth in claim 1, wherein the metal-dielectric-metal waveguide is a three-dimensional plasmonic waveguide.

6. The system as set forth in claim 1, wherein the metal-dielectric-metal waveguide comprises a dielectric layer between at least two substantially low loss metals.

7. The system as set forth in claim 6, wherein the at least two substantially low loss metals comprise one or more of silver and gold.

8. The method as set forth in claim 1, wherein the dimension of the nanofocused light is from about 5 nm to about 100 nm.

9. The method as set forth in claim 1, wherein the dimension of the nanofocused light is from about 10 nm to about 20 nm.

10. The system as set forth in claim 1, further comprising an optical writing/reading apparatus optically aligned with the nanofocused light exiting the metal-dielectric-metal waveguide.

11. A method for nanofocusing light comprising:
passing light through a dielectric waveguide;
confining the light in a first of at least two dimensions by coupling the light from the dielectric waveguide into a three-dimensional metal-dielectric-metal waveguide that tapers in the at least two dimensions from one end of the three-dimensional metal-dielectric-metal waveguide adjacent the dielectric waveguide towards an opposing end of the three-dimensional metal-dielectric-metal waveguide;
squeezing in a second dimension of the at least two dimensions the light confined in the first dimension by passing the light through a taper in the three-dimensional metal-dielectric-metal waveguide;
wherein the light is three-dimensionally reduced to a nanoscale spot.

12. The method as set forth in claim 11, wherein the light passing through the dielectric waveguide is in the ultra violet to near infrared range.

13. The method as set forth in claim 11, wherein the light passing through the dielectric waveguide is in the visible to near infrared range.

14. The method as set forth in claim 11, wherein the nanoscale spot is from about 5 nm to about 100 nm.

15. The method as set forth in claim 11, wherein the first dimension is in the vertical direction and the second dimension is in the horizontal direction.

16. A method for making a nanofocusing system comprising:
fabricating a dielectric waveguide;
separately fabricating a three-dimensional metal-dielectric-metal waveguide;
aligning one end of the dielectric waveguide with one end of the three-dimensional metal-dielectric-metal waveguide, wherein the three-dimensional metal-dielectric-metal waveguide tapers in at least two dimensions from the aligned one end of the three-dimensional metal-dielectric-metal waveguide towards an opposing end; and bonding the aligned one end of the dielectric waveguide with one end of the three-dimensional metal-dielectric-metal waveguide.

17. The method as set forth in claim 16, further comprising polishing at least one of the one end of the dielectric waveguide with one end of the metal-dielectric-metal waveguide.

18. The method as set forth in claim 16, wherein the aligning further comprises aligning one end of the dielectric waveguide with one end of the metal-dielectric-metal waveguide substantially along the center.

19. The method as set forth in claim 16, wherein the metal-dielectric-metal waveguide tapers in one dimension from the aligned end of the metal-dielectric-metal waveguide towards the opposing end.

20. The method as set forth in claim 16, wherein the cross-sectional dimension of the metal-dielectric-metal waveguide at the metal-dielectric-metal waveguide/dielectric waveguide interface is greater than the cross-sectional dimension of the dielectric waveguide.

* * * * *